(12) United States Patent
Banks

(10) Patent No.: US 8,407,614 B2
(45) Date of Patent: *Mar. 26, 2013

(54) SETTING CONTROL USING EDGES OF A USER INTERFACE

(75) Inventor: Richard M. Banks, Egham (GB)

(73) Assignee: Microsoft Corporation, Redmond, WA (US)

( * ) Notice: Subject to any disclaimer, the term of this patent is extended or adjusted under 35 U.S.C. 154(b) by 356 days.

This patent is subject to a terminal disclaimer.

(21) Appl. No.: 12/722,318

(22) Filed: Mar. 11, 2010

(65) Prior Publication Data

US 2010/0169827 A1  Jul. 1, 2010

Related U.S. Application Data

(63) Continuation of application No. 11/394,241, filed on Mar. 31, 2006, now Pat. No. 7,712,039.

(51) Int. Cl.
*G06F 3/048* (2006.01)

(52) U.S. Cl. ........ 715/772; 715/764; 715/779; 715/716; 715/833; 715/859

(58) Field of Classification Search .................. 715/764, 715/772, 771, 779, 859, 788
See application file for complete search history.

*Primary Examiner* — Omar Abdul-Ali
*Assistant Examiner* — Sherrod Keaton
(74) *Attorney, Agent, or Firm* — Shook, Hardy & Bacon L.L.P.

(57) ABSTRACT

A setting control may be mapped to an edge of a user interface to facilitate control of various settings and access thereto. The mapping may be implemented based on a number of setting values associated with the setting control and a size of a specified edge of the user interface. Additionally, multiple edges of a user interface may be mapped to a variety of setting controls. The edge-mapped setting controls may also be automatically reconfigured according to user preferences and interaction with the interface. Indicators are also generated to provide visual indications about the setting controls and/or a current setting. The appearance of indicators may be altered to convey a variety of information such as the current setting of a control or the type of setting control.

20 Claims, 7 Drawing Sheets

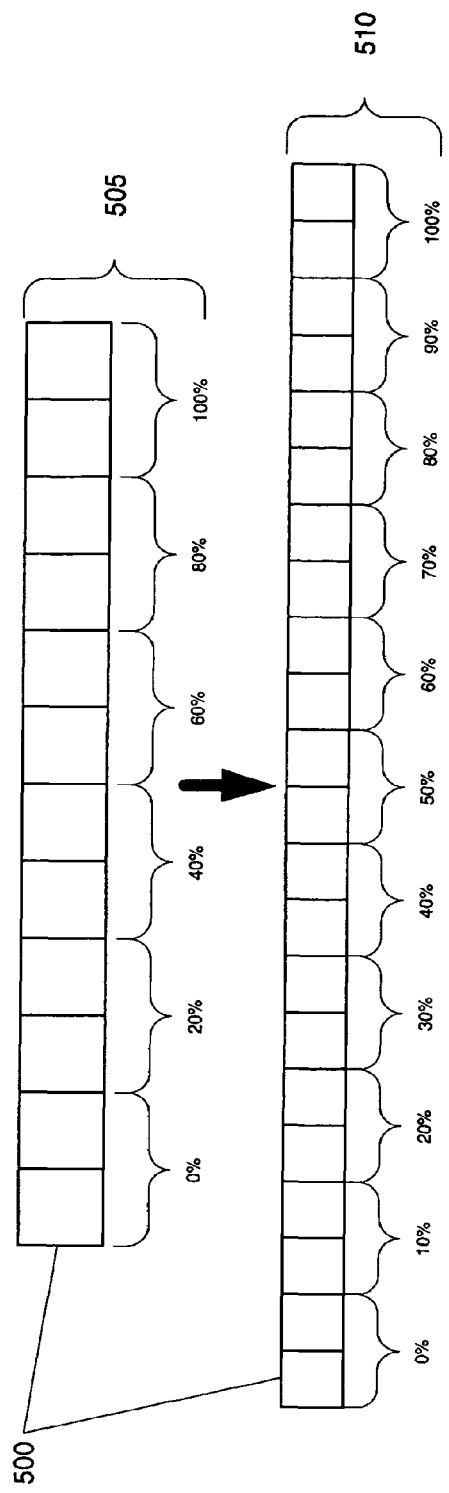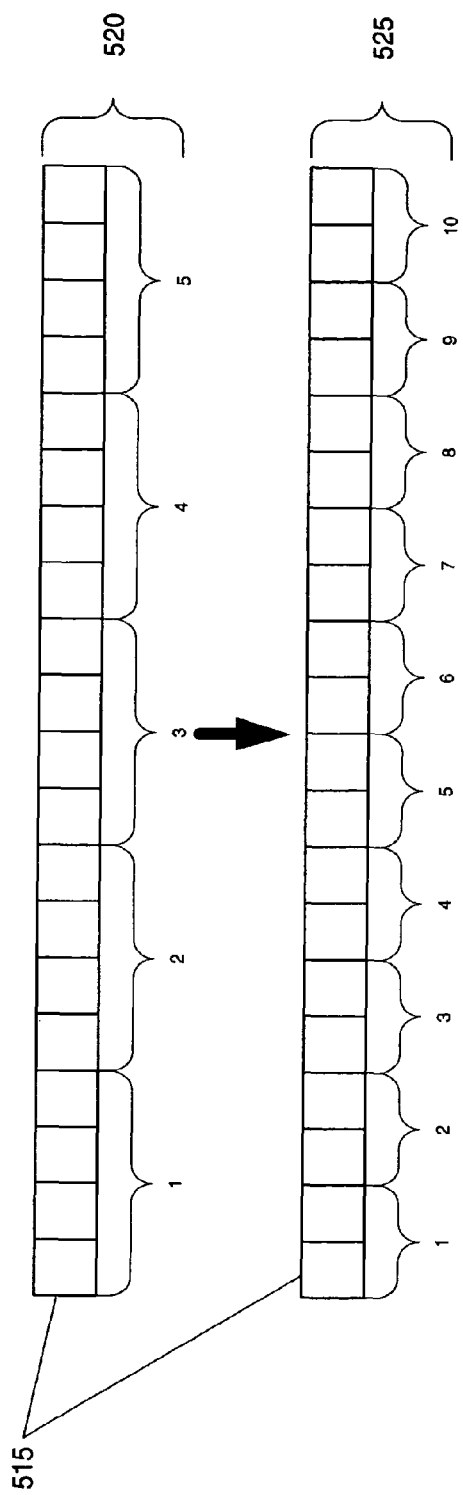
FIG. 5A
FIG. 5B

SETTING CONTROL USING EDGES OF A USER INTERFACE

CROSS-REFERENCE TO RELATED APPLICATIONS

This application is a continuation of, and claims priority to, U.S. application Ser. No. 11/394,241, filed Mar. 31, 2006, entitled "SETTING CONTROL USING EDGES OF A USER INTERFACE," the teachings of which are incorporated herein.

BACKGROUND

Interaction with computing devices has changed significantly since the inception of the graphical user interface. Users are able to control a variety of functions and settings directly from the graphical user interface without having to interact directly with an associated hardware device. For example, volume settings are often integrated into the user interface so that a user may increase or decrease the volume by adjusting a graphical slider or other interface element. Similarly, brightness of the screen is modifiable using various graphical components generated on a graphical user interface. The ability to use the graphical user interface to modify hardware settings and other functions provides an added convenience when interacting with a computing device.

Current user interfaces often require a user to navigate to a specific control panel or screen in order to alter these settings. In addition, users wanting to confirm a current setting also must access the control panel or screen in order to identify the current levels or values associated with the setting. Further, some application and hardware devices have multiple settings that are configurable by a user. In these cases, a user typically has to navigate to several different controls located in different places in order to adjust each one. Thus, in each of the aforementioned situations, a user may be inconvenienced and distracted by having to navigate to one or more control pages or panels to modify a setting or function.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects are directed to a method and system for implementing setting controls along an edge of a user interface. For example, a volume setting control may be mapped to a top edge of the user interface to allow a user to adjust the volume without having to navigate to and/or access the particular control panel. Other types of settings that may be associated with these methods and systems include brightness controls, magnification controls and scrolling controls. The mapping of the setting control to the edge involves determining a size of the edge and a set of setting values associated with the setting control. The setting values are then mapped to the edge in accordance with the size of the edge and the number of setting values to be mapped. Indicators may further be generated and displayed to provide quick information to the user about the current settings. Additional indicators or information may be made available upon detecting user interaction with the edge-mapped controls.

In another aspect, multiple edge-mapped controls may be implemented on a single user interface. The controls may be associated with different applications and/or different settings. Thus, the brightness of an application may be adjusted by a setting control mapped to the top edge of the user interface while the volume of the application may be modified by varying a setting control mapped to the right edge of the same user interface. The setting controls may further be inter-related such that altering the settings of one setting control modifies or defines characteristics of a second setting control.

In yet another aspect, multiple indicators may be displayed to convey additional information about the current setting or setting control to the user. However, when a user is not interacting with or using the setting control, one or more indicators may be hidden to reduce clutter on the user interface. Other changes in the appearance of one or more indicators may be implemented as a way to indicate a current value setting and/or other characteristics of the setting control. In one example, an indicator associated with a volume setting control may grow in size as the volume setting is increased. A setting control may further change associations based on a change in the focus of the user interface. In other words, a setting control may initially be associated with a first application window, if the user interface is focused on the first application window. Upon changing focus to a second application window, however, the setting control is disassociated from the first application window and associated with the second application window instead.

BRIEF DESCRIPTION OF THE DRAWINGS

Aspects are illustrated by way of example and not by limitation in the accompanying figures in which like reference numerals indicate similar elements and in which:

FIGS. 5A and 5B illustrate mappings of setting values of a setting control to one or more edges of a user interface according to at least one aspect.

DETAILED DESCRIPTION

In the following description, reference is made to the accompanying drawings, which form a part hereof, and in which is shown by way of illustration various aspects. It is to be understood that other aspects may be utilized and structural and functional modifications may be made without departing from the scope of the present disclosure.

Figure 1:
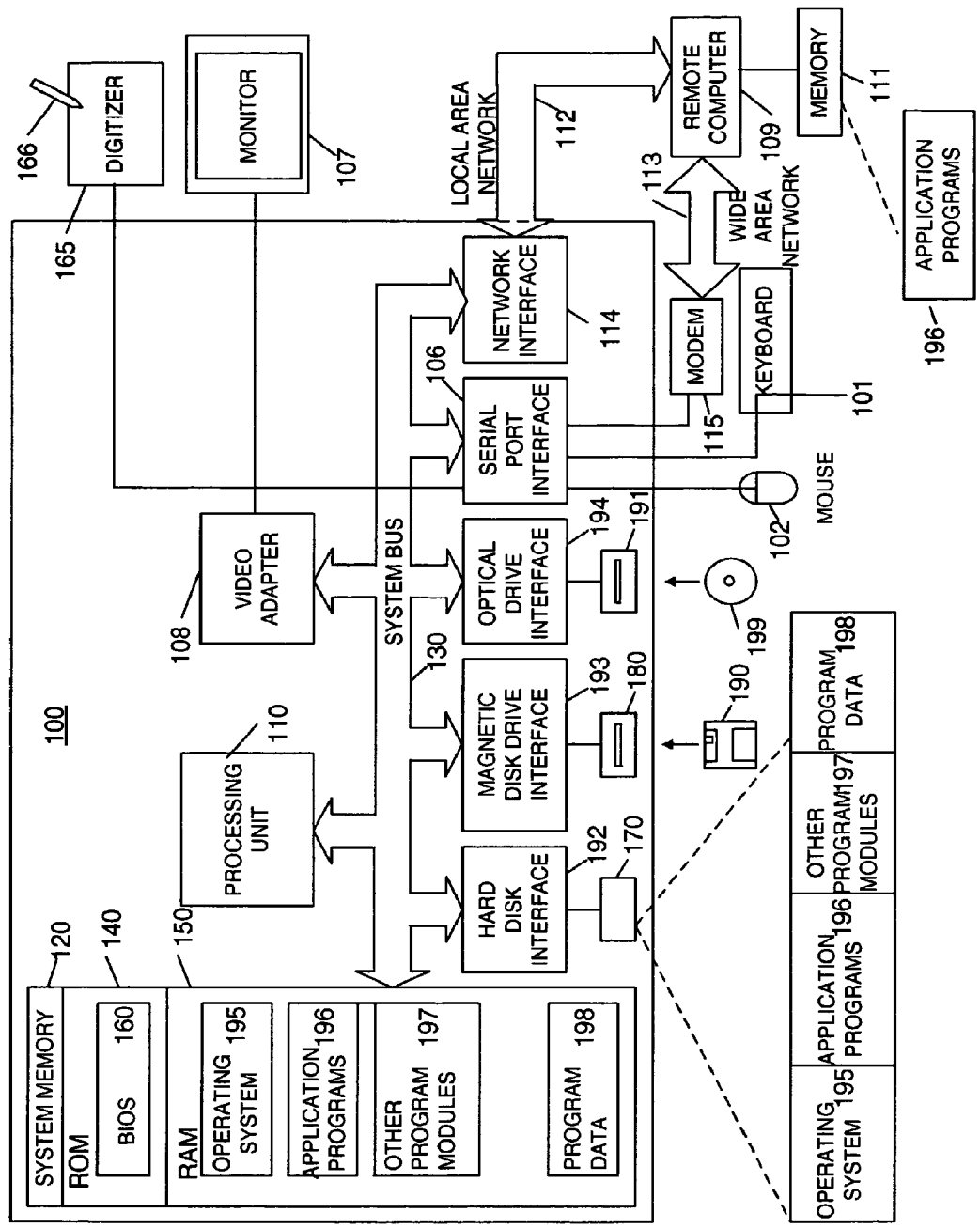
FIG. 1 illustrates a schematic diagram of a general-purpose digital computing environment that can be used to implement various aspects of the present disclosure.

FIG. 1 illustrates a schematic diagram of a general-purpose digital computing environment. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In some example environments, a stylus digitizer 165 and accompanying stylus 166 are provided in order to digitally capture freehand input. Although a connection between the digitizer 165 and the serial port interface 106 is shown in FIG. 1, in practice, the digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples, and other techniques for establishing a communications link between computers can be used. The existence of any of various well-known protocols such as TCP/IP, Ethernet, FTP, HTTP, UDP, and the like is presumed, and the computer 100 can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, an environment may be used having fewer than all of the various aspects shown in FIG. 1 and described above, and these aspects may appear in various combinations and subcombinations that will be apparent to one of ordinary skill Additional elements, devices or subsystems also may be included in or coupled to the computer 100.

Figure 2:
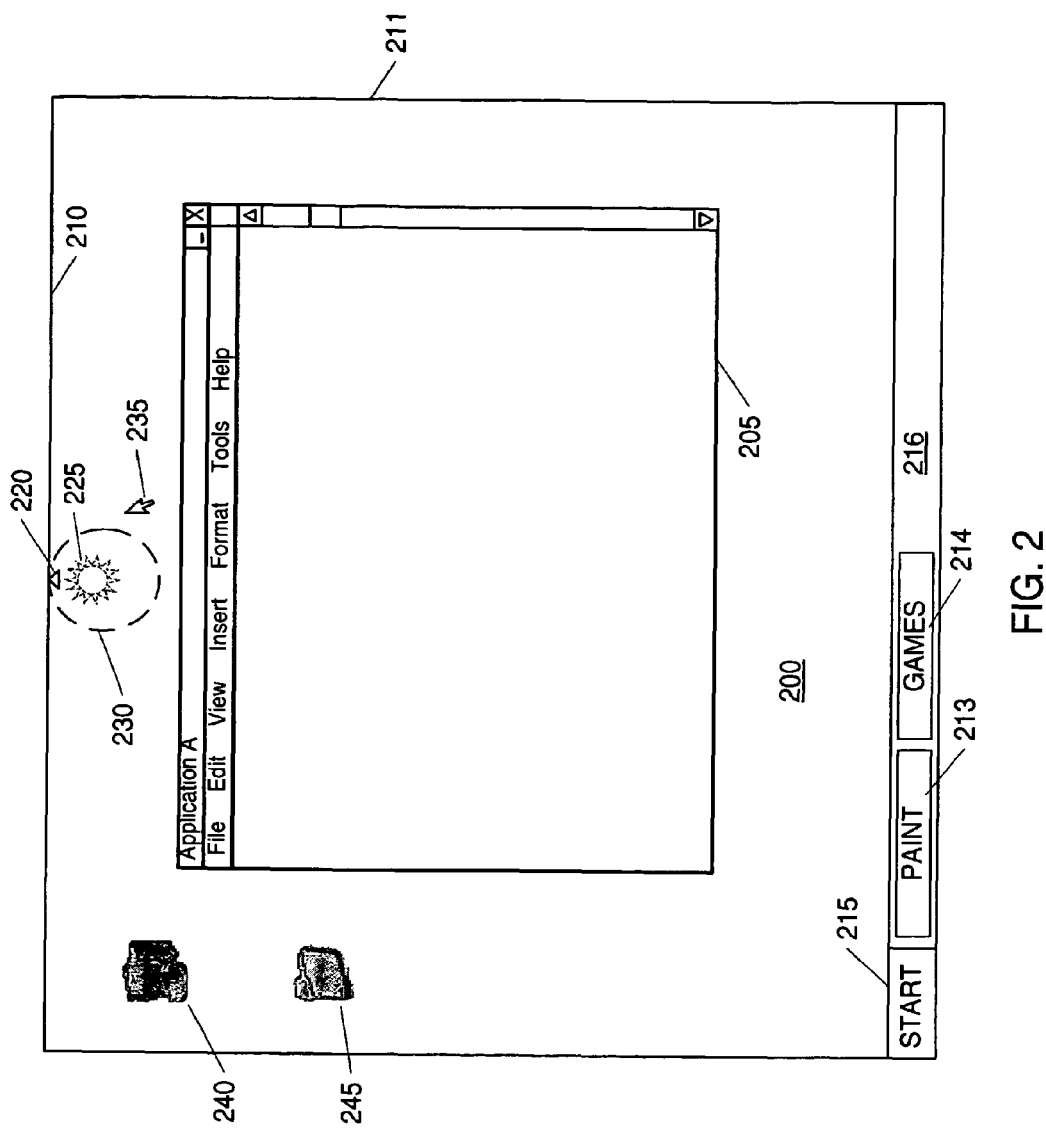
FIG. 2 illustrates a user interface implementing an edge-mapped setting control according to at least one aspect.

FIG. 2 illustrates a user interface 200 having a setting control mapped to the top edge 210 of the user interface 200 which can be displayed on the display monitor 107 (shown in FIG. 1). User interface 200 may further be characterized by one or more additional edges including side edge 211. In addition to the mapped setting controls, user interface 200 includes a number of interactive elements such as icons 240 and 245, main menu button 215, application task bar 216, application task buttons 213 and 214, application window 205 and cursor 235. User interface 200 further includes indicators 220 and 225 which provide information about a current setting value associated with the edge-mapped setting control. For example, the position of indicator 220 along top edge 210 may be indicative of a current setting value. The current setting value is selected from a scale of values associated with the setting control and mapped to the length of edge 210. Additionally or alternatively, indicator 225 may include an icon or other graphical element that changes appearance in response to changes in the setting value or control. A user may further use indicators 220 and 225 to adjust the setting control associated with the indicators by, e.g., clicking and dragging either or both indicators. Indicators 220 and 225 may also convey other types of information such as a percentage level of the setting value or an animated icon identifying the function to which the setting is associated.

According to at least one aspect, one difference between indicator 220 and indicator 225 lies in each indicator's display characteristics. Specifically, indicator 220 can be continuously or persistently displayed while indicator 225 can be shown or displayed when user interaction with the setting controls or top edge 210 is detected. In other words, regardless of whether a user is interacting with the setting controls, indicator 220 is displayed on user interface 200. In contrast, indicator 225 can be hidden when a user is not interacting with the setting controls, and revealed or displayed when user interaction with the controls or edge 210 is detected. User interaction with the setting control or edge 210 may include guiding an element of user interface 200 corresponding to user input such as cursor 235 to within a predefined proximity area 230 of indicator 220 or 225 or edge 210. Thus, according to at least one aspect, when cursor 235 is detected inside proximity area 230, indicator 225 is displayed. Once cursor 235 leaves area 230, however, indicator 225 becomes hidden. This allows the user interface to reduce the amount of clutter while conveying adequate information at relevant times. Various types of proximity areas may be implemented and numerous forms of user interaction may be defined for controlling the display of indicator 225. Alternatively, the display characteristics of indicators 220 and 225 may further be customized and otherwise modified based on user preferences. For example, in one or more configurations, both indicators 220 and 225 may be persistent. Alternatively, both indicators 220 and 225 may be displayed only when user interaction with the edge-mapped control is detected.

The setting controls may be adjusted in a variety of ways including, as discussed previously, clicking and dragging either or both of the indicators along edge 210. A user may also click or select another area along edge 210 to cause indicators 220 and 225 to move from their original positions to the newly selected position. Additionally, a user may use hardware controls (not shown) such as brightness control keys on a keyboard in order to adjust the settings. In such an instance, indicators 220 and 225 may automatically adjust their positions along edge 210 in response to detecting a user's key input. Other methods of adjusting setting controls may be similarly implemented.

Figure 3:
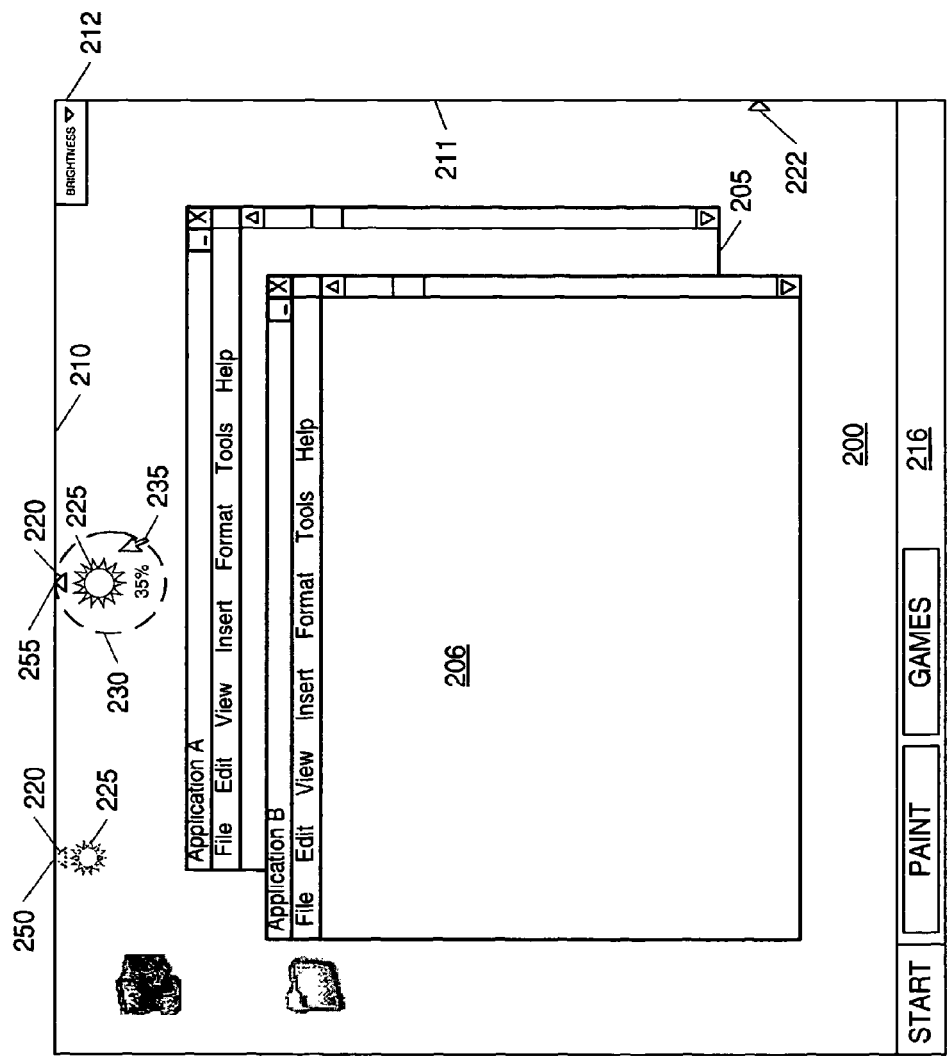
FIG. 3 illustrates a user interface implementing multiple edge-mapped setting controls associated with multiple applications according to at least one aspect.

FIG. 3 illustrates the use of multiple edges of user interface 200 to control multiple settings according to at least one aspect. User interface 200 includes cursor 235, application windows 205 and 206, setting selector 212, top edge 210, side edge 211 and indicators 220, 222 and 225. Mapping different setting controls to different edges 210 and 211 of user interface 200 facilitates a user's control of settings associated with individual applications or application windows such as windows 205 and 206. In one example, the setting controls associated with top edge 210 corresponds to a brightness control of application window 205, while the setting controls of side edge 211 controls the brightness of application window 206. Under this scheme, a user would be able to change the brightness of window 206 without having to initially change the focus of user interface 200 and associate the brightness control of top edge 210 to window 206. Further, the controls associated with each of the edges 211 and 210 may correspond to a different type of setting of the same application or element thereof. For example, the setting controls of edge 211 may correspond to volume adjustment of the underlying application of window 206, while the controls of edge 210 may correspond to a font or text size of data displayed in window 205. Additionally, indicator 222 and indicator 220 may take on different appearances in order to differentiate between the setting controls and their associated application or application windows.

FIG. 3 also illustrates the adjustment of a setting control and an associated change in the appearance of indicator 225. In addition to the physical movement of indicators 220 and 225 from position 250 on edge 210 to position 255 in response to a user's adjustment of the setting control, the appearance of indicator 225 may also change. For example, the increase or decrease in size of indicator 225 provides an additional visual indicator of the current setting value. Thus, increasing the brightness of application window 205 may cause indicator 225 to increase from the current size to a new larger size in addition to changing positions along edge 210. Alternative changes in the appearance of indicator 225 may also be implemented, including changing indicator color, adding or removing the number of "rays" of the sun icon used for indicator 225 and/or altering the speed of an animation associated with indicator 225. It will be appreciated that any of a myriad of visual effects associated with the appearance of indicator may be changed in response to an action causing the position of indicator 220 to change along the edge 210.

Often, an application, device or interface has multiple user-configurable settings that can be controlled in different control panels. To further facilitate user control of and interaction with multiple setting controls, user interface 200 includes setting selector 212 which in response to a user selection can cause the setting associated with the controls of top edge 210 to change. For example, top edge 210 may be initially associated with a brightness control of monitor 107 on which user interface 200 is displayed. A user may interact with the setting selector 212 to view a list of available settings and select a new setting such as hue or rotation. By selecting a new setting, the setting controls and associated scale of setting values are modified to correspond to the new setting. For example, switching from brightness or rotation causes the scale of setting values to change from a level of brightness to a degree of rotation. In addition, indicators 220 and 225 may also change in appearance or function in accordance with the newly selected setting. The setting selector 212 may be implemented using a variety of selection methods including, but not limited to, a drop down menu, a series of selection buttons corresponding to the multiple settings and/or a drag-and-drop interface.

Figure 4:
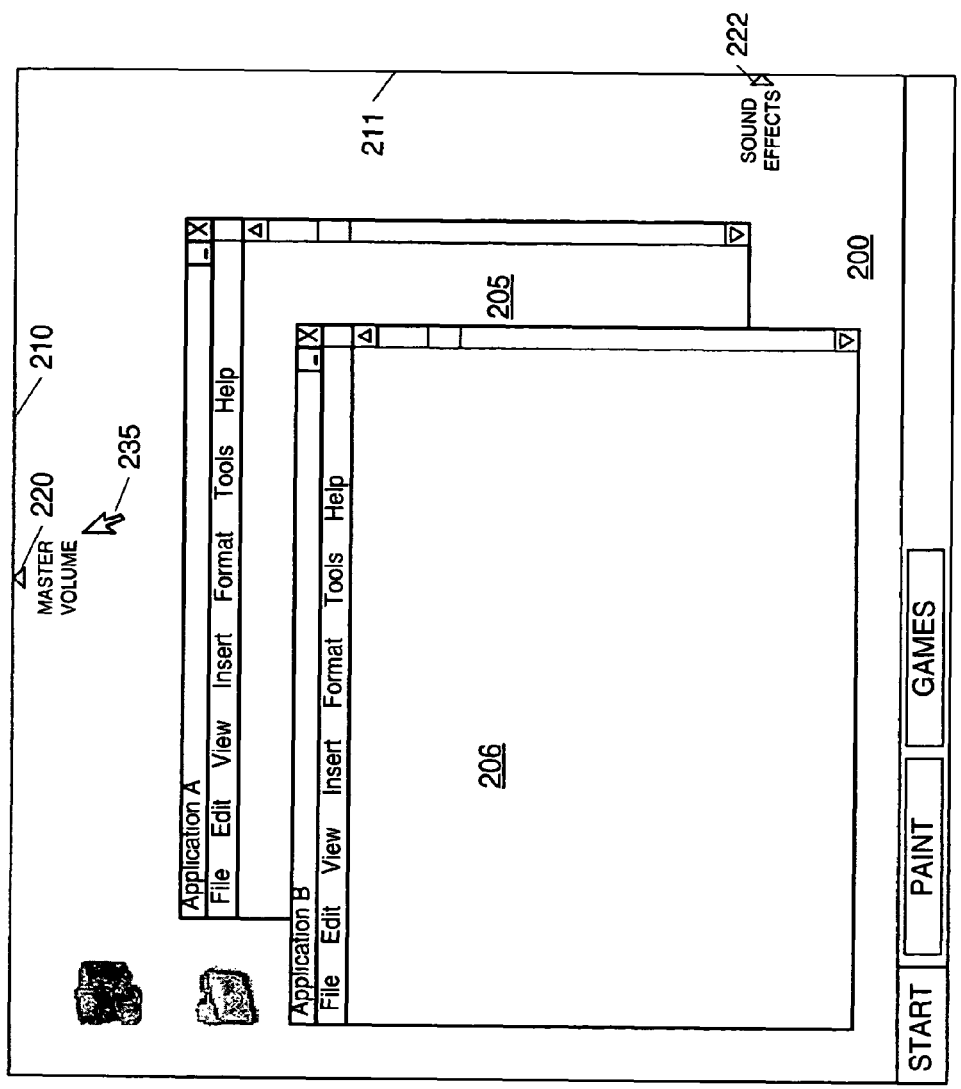
FIG. 4 illustrates a user interface implementing inter-related edge-mapped setting controls according to at least one aspect.

In an aspect shown in FIG. 4, user interface 200 includes two inter-related setting controls. Specifically, the master volume setting controls associated with edge 210 affect the settings and characteristics of the sound effects volume control associated with edge 211. In one instance, the master volume control specifies a maximum volume level to which all other volume controls may be set. Accordingly, by adjusting the master volume, the scale of setting values and the setting controls associated with the sound effects volume control would be recalculated and remapped to edge 211 in accordance with the new maximum volume. The position of indicator 222 may also be affected and adjusted by a change in the master volume setting controls of edge 210 due to the remapping of setting values associated with the sound effects volume.

In another aspect, the settings controls of edges 210 and 211 can be configured to correspond to an application or element thereof on which the user interface is currently focused. In FIG. 4, focus is shown on application window 206. As such, the controls of edges 210 and 211 would be associated with window 206 and the underlying application. If a user selects or activates application window 205, however, focus may be switched from window 206, in which case, the correspondence between application window 206 and the setting controls of edges 210 and 211 would be severed. In response to the change in focus, the setting controls of edges 210 and 211 would then be associated with window 205 and the underlying application thereof. Additionally or alternatively, in other aspects the settings controls may also be adjusted based on the new association with window 205. For example, window 205 may have a maximum brightness that is less than the maximum brightness permitted for window 206. As such, brightness setting controls (not shown) of edges 210 and 211 may be remapped based on a new scale of setting values dictated by such a change in maximum allowable brightness.

FIGS. 5A and 5B illustrate mappings of a scale of setting values associated with a setting control to an edge of a user interface according to an aspect. FIG. 5A illustrates a remapping in response to a change in resolution of the user interface and/or size of an edge. In mapping 505, edge 500 is initially 12 pixels in length. To ease user interaction, two pixels are mapped to each setting value, providing a larger selection area for each setting value. As such, edge 500, in mapping 505, is able to accommodate 6 setting values (i.e., 12 pixels/2 pixels per setting=6 settings). Thus, in one example, six volume percentages can be mapped to edge 500. If, however, edge 500 expands to 22 pixels in length, edge 500 would be able to accommodate 11 setting values instead of the previous 6. Accordingly, a new scale of 11 setting values, e.g., 0-100% divided in 10% intervals, for the volume control is determined and remapped to edge 500 to produce mapping 510. In FIG. 5B, the size of edge 515 remains constant but the scale of setting values changes. To compensate for the change in the scale and number of setting values, edge 515 or the underlying user interface may alter the allocation of pixels per setting value. In both mappings 520 and 525, edge 500 is 20 pixels in length. However, in mapping 520, the scale of setting values consists of 5 values, whereas in mapping 525, the scale of setting values is doubled to 10 setting values. As such, edge 500 initially allocates 4 pixels for each of the 5 setting values to produce mapping 520. In response to the increase in setting values, however, the pixels per setting value is recalculated and the new scale of 10 setting values is remapped to edge 500 to generate mapping 525. Numerous other methods may also be used to map and remap a scale of setting values to an edge having a specified pixel length. For example, rather than redistribute pixels, the scale of setting values may be reduced by selecting a representative sample. Thus, in the instance of mappings 520 and 525, 5 values (e.g., 2, 4, 6, 8, 10) may be selected from the 10 total setting values in response to the increase in setting values instead of redistributing the pixels of edge 500 to fit all 10.

Figure 6:
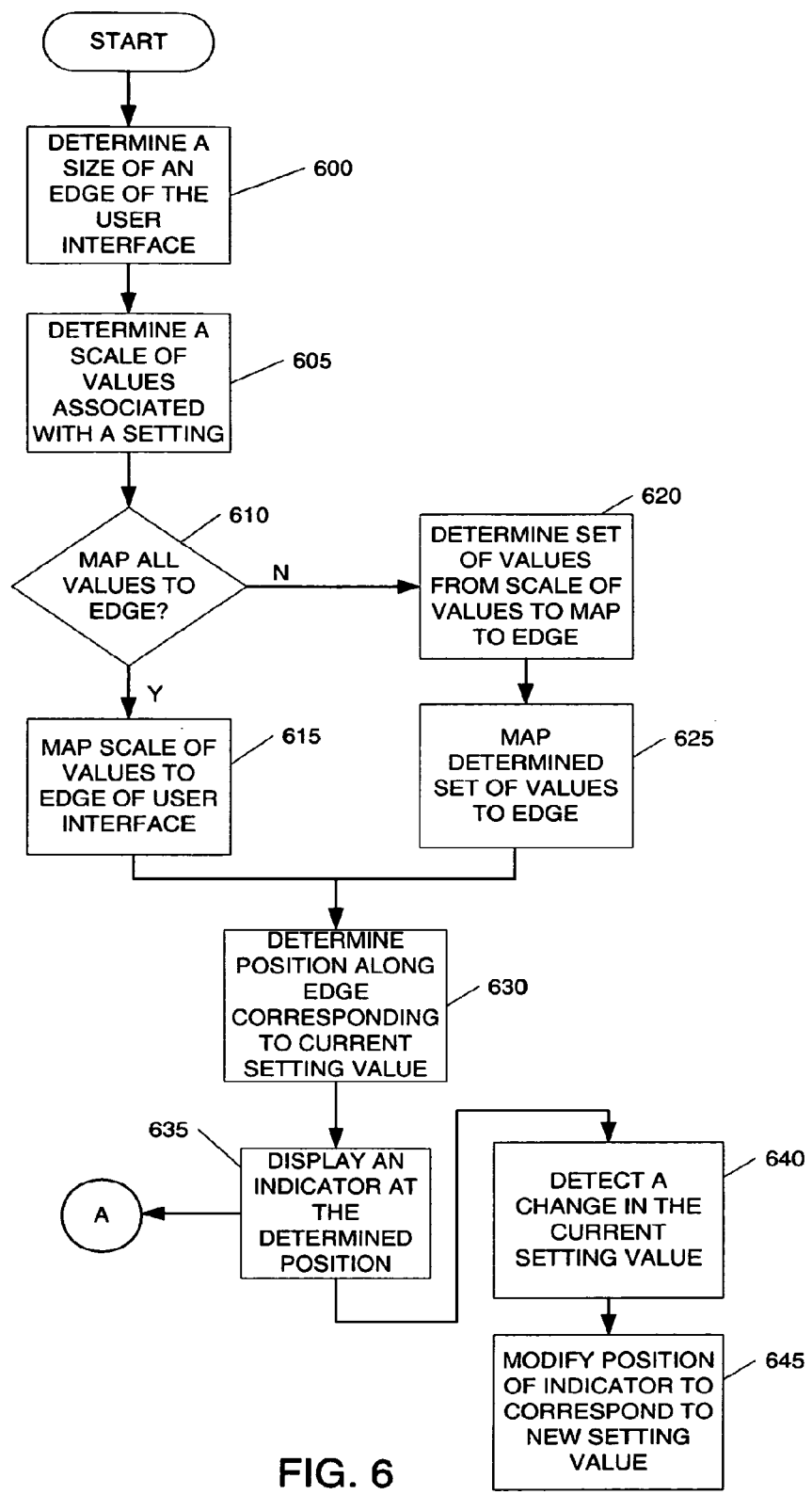
FIG. 6 is a flowchart illustrating a method for mapping a setting control to an edge of a user interface according to at least one aspect.

FIG. 6 is flowchart illustrating a method for mapping a setting control to an edge of a user interface according to at least one aspect. In step 600, the size of a specified edge of the user interface is determined. The length may be determined in pixel length or some other unit of measurement. In step 605, a scale of values associated with the setting control is determined. The scale of values represents a series of values, associated with the setting control, available for selection by a user. The determination of step 605 may further be based on the result of the determination in step 600. In other words, a scale of values may be generated that fits specifically with the determined size of the edge. A determination is made in step 610 as to whether all the values in the scale of setting values should be mapped to the edge. The determination of step 610 may be based on the pixel length of the edge, a pixel to number of setting values ratio, user preferences or any of a variety of factors associated with mapping the values to the edge. If, in step 610, it is determined that the entire scale of values should be mapped to the edge, then each of the values in the scale is assigned to one or more pixels of the edge. If, however, all values are not to be mapped, then, in step 620, a set of values is selected from the scale for mapping to the edge. The number of values that are selected may be determined based on numerous considerations including user preferences, edge length and/or a total number of setting values in the scale. Upon determining and/or selecting the set of values, the values are then mapped to the edge of the user interface in step 625.

Once the scale of values or set of values has been mapped to the edge, an indicator is generated and placed along the edge to identify a current value of the setting control. Thus, in step 630, a position along the edge corresponding to the current setting value is determined. After determining an appropriate position, the indicator is displayed at that position in step 635. The appearance of the indicator may be modified according to user preferences and may act as an additional indicator of information associated with the setting control. For example, the size and/or color of the indicator may correspond to the current value of the setting control. In steps 640 and 645, if a change is detected in the current setting value, a new position along the specified edge of the user interface is determined corresponding to the new current setting value. The indicator is then repositioned at the new location along the edge.

Figure 7:
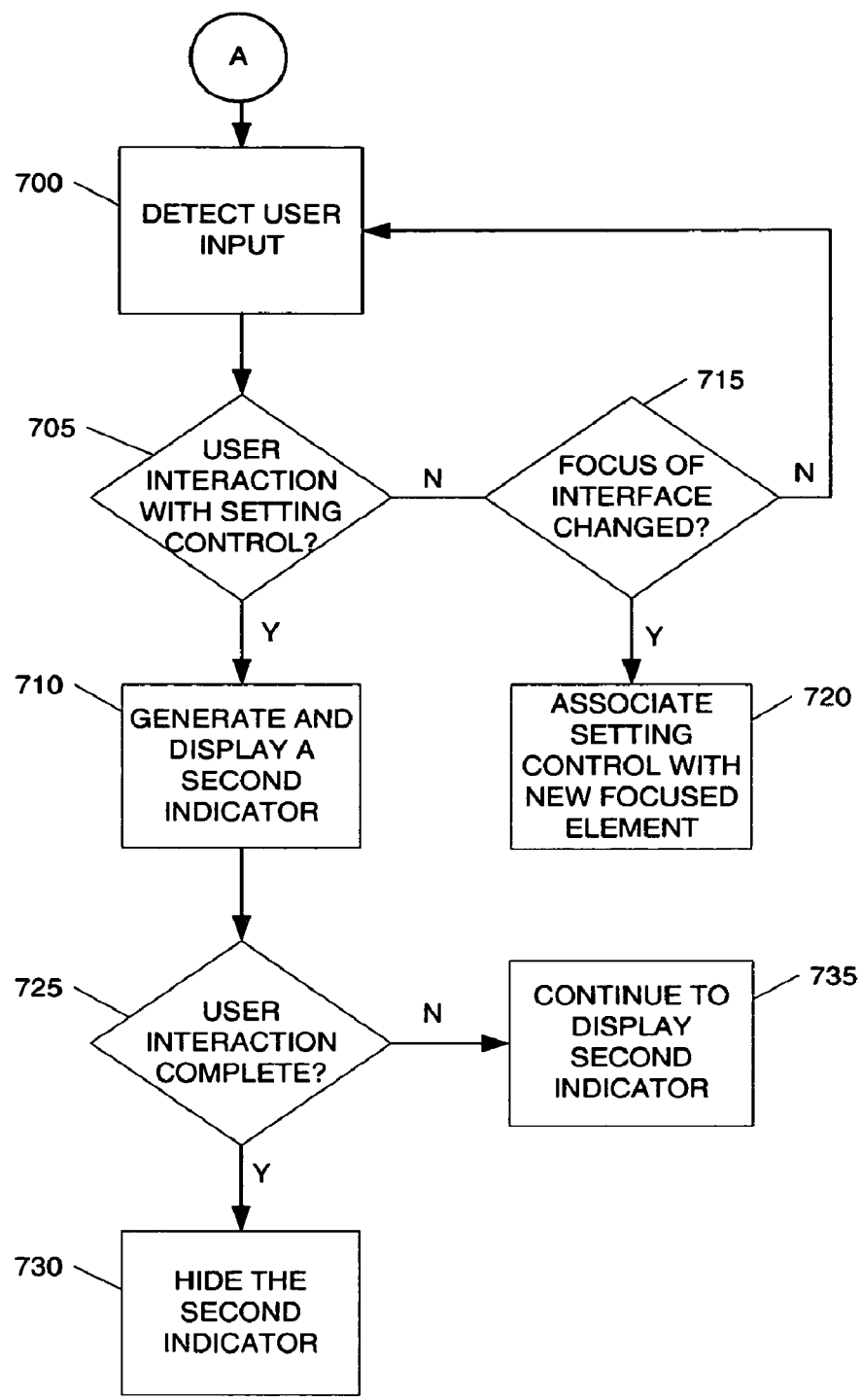
FIG. 7 is a flowchart illustrating a method for handling user interaction with an edge-mapped setting control according to at least one aspect.

FIG. 7 is a flowchart illustrating a method for providing information using indicators to a user of a setting control mapped to an edge of a user interface according to at least one aspect. Step 700 stems from step 635 of FIG. 6, in which a first indicator is displayed at a determined position. In steps 700 and 705, user input is detected and evaluated to determine a type of user input. If the user input does not correspond to user interaction with the mapped setting control, a second determination is made in step 715 to determine whether the input corresponds to a change in focus of the user interface. In other words, the interface determines whether the user has changed focus to another element of the user interface. If the user has, then in step 720, the setting control is associated with the new focused element instead of the previous focused element. In one example, upon user selection of a second application causing focus to be changed to the second application, a mapped volume control may be disassociated with a previous first application and associated with the second application. Accordingly, rather than controlling the volume of the first application, the volume control would be linked to the volume of the second application instead.

If, however, in step 705, the user input does correspond to user interaction with the setting control, a second indicator may be generated and displayed in step 710. Interaction may be defined in a variety of ways including being within a predetermined proximity of the edge or an indicator. The second indicator may, for instance, provide additional or more detailed information relating to the current settings of the setting control. In step 725, a determination is made as to whether the user interaction is complete or ceased. If so, then in step 730, the second indicator is hidden. If however, the user interaction is on-going, then the second indicator continues to be displayed in step 735 until the user interaction is completed or ceases. Alternatively or additionally, the second indicator may also become hidden after a predefined amount of time. Further, in one or more instances, a user may be interacting with a setting control while changing the focus of the user interface. In such cases, the responses discussed above may occur simultaneously or in sequential order.

The methods and systems described herein have been described, in large part, with respect to control settings such as brightness and volume of a computing device. However, one of skill in the art will appreciate that these methods and systems may be applied to a variety of settings and functions. For example, an edge-mapped setting control may be associated with a scrollbar of an application window. In another example, an edge-mapped setting control may correspond to an undo function of a word processing application so that a user may use the setting control to undo a sequence of changes. A setting control may further be mapped to multiple edges of the user interface. For example, in the illustration of FIG. 2, the setting control mapped to top edge 210 may, instead, be mapped continuously along both top edge 210 and side edge 211. In other words, top edge 210 and side edge 211 would be treated as one continuous edge for the purposes of mapping the setting control. Additionally, much of the description relates to setting controls which have linearly and/or sequentially related setting values. However, the methods and systems may also be applied to instances where the values or settings may be non-linear, non-sequential and/or discrete. In one example, a setting control may include a set of setting values wherein each setting value corresponds to a different window or application displayed on the user interface. Upon selecting a different value of the setting control, the focus of the user interface may be changed to the window or application associated with the selected setting value.

Further, as used herein, an edge may also refer to the entire edge of a user interface or portions thereof. As such, an edge-mapped setting control may encompass either an entire edge or portions thereof. A setting control may be, for example, variably mapped in accordance with a visible portion of an edge. Specifically, if the visible portion of the edge changes, the setting control may be automatically remapped to the new visible portion. In one or more configurations, multiple setting controls may be mapped to different portions or the same portion of an edge. For example, a volume control may be mapped to one half of a top edge while a brightness control is mapped to a second half of the same top edge. Alternatively or additionally, the volume control and the brightness control may further correspond to different applications. Thus, two or more setting controls, each corresponding to a different application, may also be mapped to the same edge or portions thereof. In addition, in instances where two or more setting controls share at least a portion of the same edge, the control of the two overlapping settings may be differentiated based on the use of different indicators generated for each of the two controls. The indicators may differ in appearance or size to aid the user in determining which indicator to use for controlling a particular setting or application, if the setting controls are associated with different applications. In one or more configurations, a setting control may be mapped across a user interface displayed across multiple monitors. For example, a user may extend the user interface across two separate monitors. As such, the top edge may be defined by the top edges of the user interfaces displayed on both monitors. Setting values associated with a particular setting control may then be mapped across the entire top edge of the extended user interface (i.e., across the top edge of both monitors). Further, the methods described herein may also be embodied in computer readable mediums.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer memory storing computer readable instructions that, when executed by a processor, cause the processor to perform a method of modifying a scale of a first set of setting values associated with a setting control based on an adjustment of a second set of setting values associated with the setting control, the method comprising the steps of:
   determining a length of a complete edge of the display screen of the monitor;
   determining a scale of a first set of setting values associated with a setting control, wherein the scale of the first set of setting values is determined based on the determined length of the complete edge of the display screen of the monitor;
   mapping the scale of the first set of setting values to the determined length of the complete edge of the display screen of the monitor;
   receiving an adjustment to a second set of setting values also associated with the setting control;
   modifying the scale of the first set of setting values based on the adjustment of the second set of setting values; and
   mapping the modified scale of the first set of setting values based on the adjustment of the second set of setting values to the determined length of the complete edge of the display screen of the monitor.

2. The computer memory of claim 1, further comprising:
   displaying an indicator located at a position along and connected to the complete edge of the display screen of the monitor, wherein the position of the indicator corresponds to a value of the setting control.

3. The computer memory of claim 2, wherein changing the value of the setting control from a first value to a second value alters the position of the indicator to correspond to the second value.

4. The computer memory of claim 2, wherein changing the scale of the first set of setting values to the modified scale of the first set of setting values alters the position of the indicator to correspond to the mapping of the modified scale of the first set of setting values.

5. The computer memory of claim 2, wherein the appearance of the indicator changes in accordance with a current value of the setting control.

6. The computer memory of claim 5, wherein the size of the indicator changes in accordance with a current value of the setting control.

7. The computer memory of claim 1, wherein the setting control includes a volume control.

8. The computer memory of claim 1, wherein the step of determining a scale of a first set of setting values includes determining a number of setting values that fit on the complete edge of the display screen of the monitor.

9. A computer memory storing computer readable instructions that, when executed by a processor, cause the processor to perform a method of mapping a scale of setting values based on selecting to focus on an application, the method comprising the steps of:
   determining a length of a complete edge of the display screen of the monitor;
   determining a first scale of setting values associated with a setting control of a first application, wherein the first scale of setting values is determined based on the determined length of the complete edge of the display screen of the monitor;
   determining a second scale of setting values associated with a setting control of a second application, wherein the second scale of setting values is determined based on the determined length of the complete edge of the display screen of the monitor;
   selecting to focus on the first application;

mapping the first scale of setting values to the determined length of the complete edge of the display screen of the monitor in response to the selecting to focus on the first application;

changing selection of focus from selecting to focus on the first application to selecting to focus on the second application; and mapping the second scale of setting values to the determined length of the complete edge of the display screen of the monitor in response to the selecting to focus on the second application.

10. The computer memory of claim 9, wherein the mapping of the second scale of setting values replaces the first scale of setting values.

11. The computer memory of claim 9, further comprising:
displaying an indicator located at a position along and connected to the complete edge of the display screen of the monitor, wherein the position of the indicator corresponds to an application currently in focus.

12. The computer memory of claim 11, wherein the appearance of the indicator changes in accordance with a current application that is in focus.

13. The computer memory of claim 12, wherein the size of the indicator changes in accordance with a current application that is in focus.

14. A computer memory storing computer readable instructions that, when executed by a processor, cause the processor to perform a method of modifying a scale of a first set of setting values associated with a setting control based on an adjustment of a second set of setting values associated with the setting control, the method comprising the steps of:
determining a length of a complete edge of the display screen of the monitor;
determining a scale of a first set of setting values associated with a setting control, wherein the scale of the first set of setting values is determined based on the determined length of the complete edge of the display screen of the monitor;
mapping the scale of the first set of setting values to the determined length of the complete edge of the display screen of the monitor;
receiving an adjustment to a second set of setting values associated with the setting control, the adjustment decreasing a maximum threshold of setting values;
modifying the scale of the first set of setting values by decreasing a maximum threshold of the scale of the first set of setting values based on the adjustment of the second set of setting values; and
mapping the modified scale of the first set of setting values based on the adjustment to the second set of setting values to the determined length of the complete edge of the display screen of the monitor.

15. The computer memory of claim 14, further comprising:
displaying an indicator located at a position along and connected to the complete edge of the display screen of the monitor, wherein the position of the indicator corresponds to a value of the setting control.

16. The computer memory of claim 15, wherein changing the value of the setting from a first value to a second value alters the position of the indicator to correspond to the second value.

17. The computer memory of claim 5, wherein changing the scale of the first set of setting values to the modified scale of the first set of setting values alters the position of the indicator to correspond to the mapping of the modified scale of the first set of setting values.

18. The computer memory of claim 15, wherein the appearance of the indicator changes in accordance with a current value of the setting control.

19. The computer memory of claim 18, wherein the size of the indicator changes in accordance with a current value of the setting control.

20. The computer memory of claim 14, wherein the setting control includes a volume control.

* * * * *